No. 618,805. Patented Jan. 31, 1899.
H. E. PRIDMORE.
CORN HARVESTER.
(Application filed Mar. 6, 1895.)
(No Model.) 2 Sheets—Sheet 2.
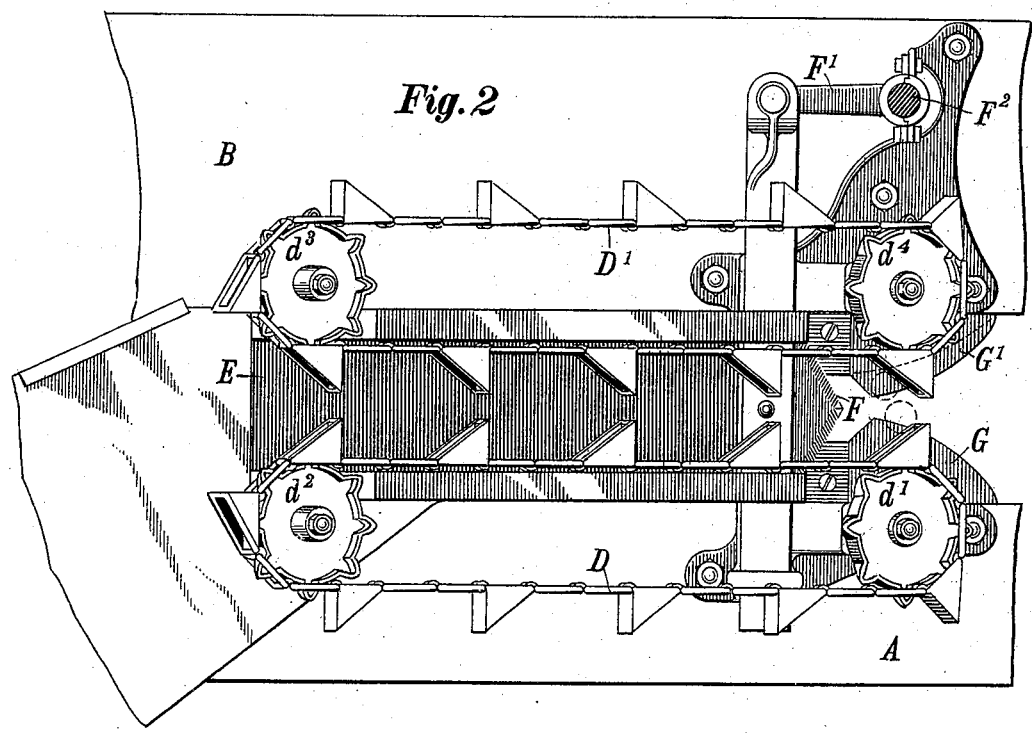
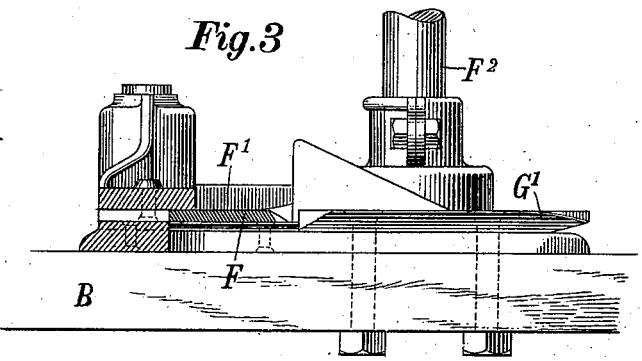
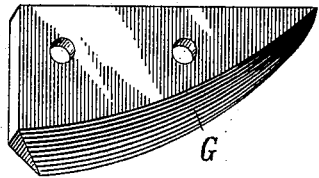
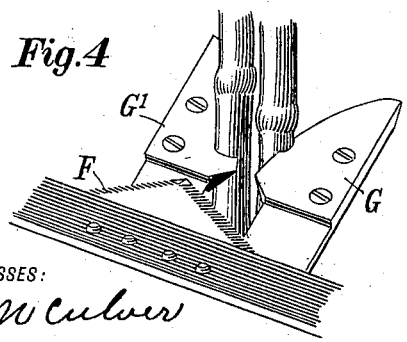
WITNESSES:
John M Culver
E. E. Clinton.
INVENTOR
Henry E. Pridmore
BY R. B. Swift.
ATTORNEY.

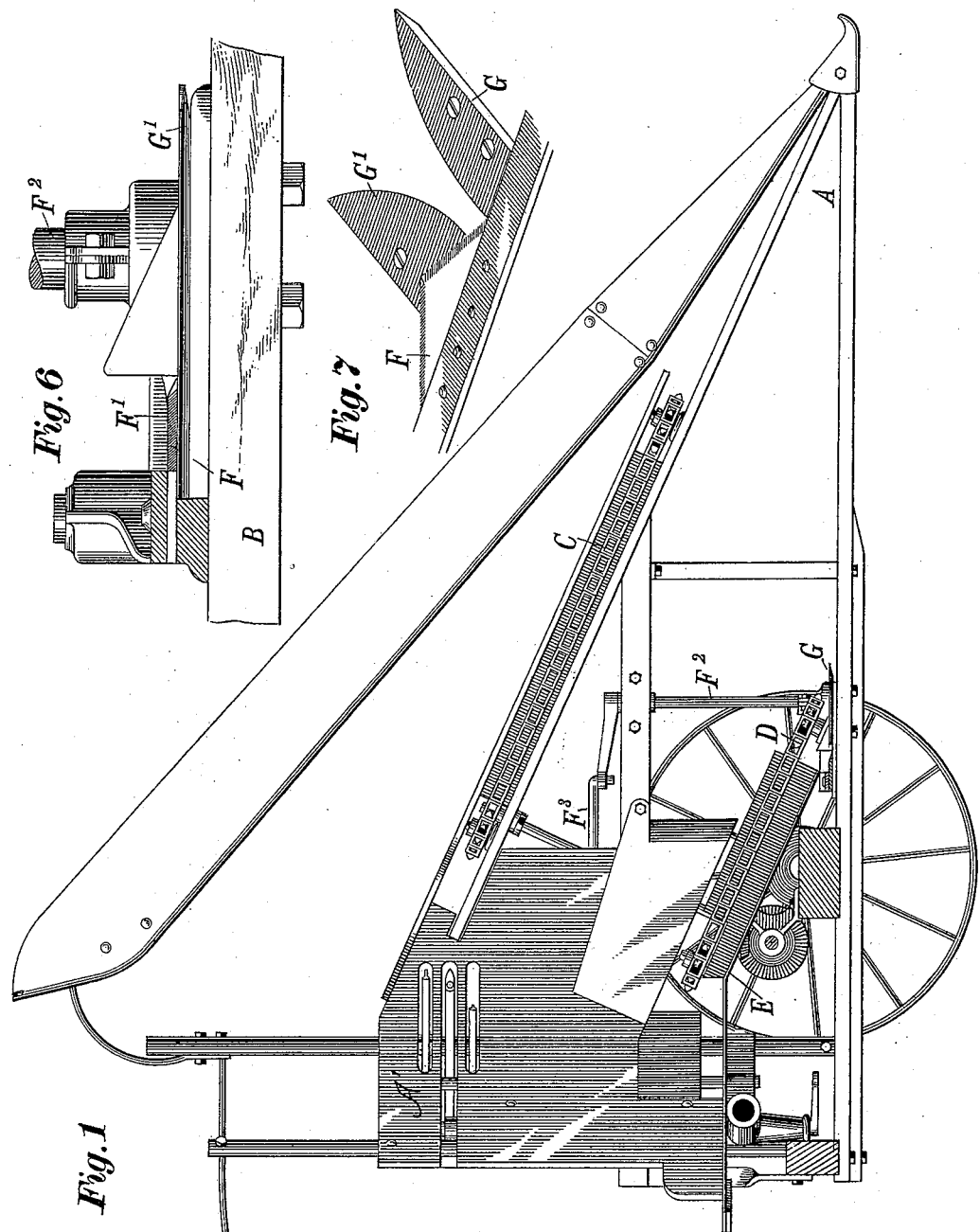

UNITED STATES PATENT OFFICE.

HENRY E. PRIDMORE, OF CHICAGO, ILLINOIS.

CORN-HARVESTER.

SPECIFICATION forming part of Letters Patent No. 618,805, dated January 31, 1899.

Application filed March 6, 1895. Serial No. 540,796. (No model.)

*To all whom it may concern:*

Be it known that I, HENRY E. PRIDMORE, a citizen of the United States, residing at Chicago, in the county of Cook and State of Illinois, have invented a new and useful Improvement in Corn-Harvesting Machines, of which the following is a specification.

My invention relates to the general type of corn-harvesting machines shown in the patent to Peck, No. 466,512, dated January 5, 1892, and has particular reference to the mechanism for severing the standing stalks. In the patent referred to it is proposed to sever the stalks by means of a reciprocating cutter that is driven by gearing operated by the rotation of the supporting-wheels practically like those used in grain-harvesters. Experience has demonstrated, however, that no machine can be wholly successful under the varying conditions in which these corn-harvesters have to work that relies on this method for cutting the stalks.

As is well understood, corn is usually planted in hills at intervals apart where the stalks grow in bunches, which frequently contain from four to six large stalks. In any machine employing a cutting apparatus of the type shown in Peck's patent the stalks in these hills must all be severed within a very short distance of forward movement of the machine, thus throwing very sudden and enormous strains upon all the parts, and these strains occur with constant repetition as the machine proceeds and are followed by corresponding periods when the cutting apparatus is doing nothing. Where the corn is heavy or of luxuriant growth, it is often impossible, owing to the character of the ground in all corn-fields, to get sufficient traction of the supporting-wheels to put power enough into the reciprocating cutter to sever all the stalks in these hills, and the forward movement of the machine drags on the uncut or partially severed stalks, greatly increasing the strains on all the parts and the draft of the machine, and the knife becomes clogged and stops. Attempts have heretofore been made to provide cutters for these machines that would sever the stalks by the forward movement of the machines alone; but these attempts have all been unsuccessful, and prior to my present invention no practically successful corn-harvester has ever been introduced to the public having such an operation. The principal reason for this I believe to be that in none of the machines heretofore attempted has there been any adequate provision for holding the standing stalks in vertical position and up to the action of the cutting-knives or for getting rid of the grass, weeds, and other trash that tend to clog the knives or for cutting such stalks as have not of themselves sufficient strength and stiffness to offer the necessary resistance to the knives, and none of the attempts with this class of machines, so far as I am aware, have contemplated the binding of the cut stalks before discharging them into a shocker or on the ground, an operation that further complicates the problem in hand and necessitates that the corn should not only be held upright while under the action of the knives, but that its vertical position should be preserved while it is being forwarded to the rear and presented to the binder. My invention relates to this latter class of machines particularly; and it consists in the construction, arrangement, and organization of parts embraced in the machine hereinafter described and shown in the accompanying drawings, wherein—

Figure 1 is a longitudinal elevation, partly in section, of a corn-harvesting machine, showing the location of the knife on the machine, also one of the prongs and the stalk holding and forwarding devices thereon, it being understood that the part of the machine shown is but one side of the corn-harvester. Fig. 2 is a plan view showing the severing-knives, together with the lower set of holding and forwarding devices that sweep the corn across the knives and to the rear. Fig. 3 is a section in elevation, looking upon one side of the knife from the corn passage-way. Fig. 4 is a perspective showing the knives removed from the machine in the act of cutting the stalks of corn. Fig. 5 is a perspective view of one of the stationary knives from the under side. Fig. 6 is a view similar to Fig. 3, but showing a modification of the stationary knife, while Fig. 7 is a perspective view of a modification of the knife shown in Fig. 4.

Similar letters refer to similar parts throughout the different views.

In the drawings, A represents one of the pair of projecting prongs that are in advance of the cutting mechanism. The sill of the other prong B is shown in Fig. 2 and the prong is of a similar shape to A.

A' denotes the position of the binder, it being located, as shown, at the rear of the machine at some little distance behind certain stalk-cutting devices, to be hereinafter described.

The two prongs form a passage-way for the corn and embrace and lift the corn as the machine is drawn along the row. Stalk holding and forwarding devices are located on these prongs, the one on the prong A being shown in Fig. 1 and is lettered C. These devices assist in lifting and straightening the stalks and take a hold upon them, thus keeping them in an upright position, while the forward advance of the machine draws the stationary knife located below against the stalks. Beneath the upper holding and forwarding devices C and located on each side of the row are other holding and forwarding devices D and D'. In the drawings these devices are represented as chains traveling over sprocket-wheels $d'$ $d^2$ $d^3$ $d^4$. Behind the knife, which will be hereinafter described, is an inclined flooring E, which leads upward and rearward to the table which supports the stalks. The holding and forwarding devices D and D' are located practically in a plane parallel with this inclined flooring E and upon either side of the stalk passage-way, the forward path of these devices being such as to sweep the knives and hold the stalks as they drag along against their cutting edges.

The cutting apparatus consists of main stationary knives G G' and a supplemental reciprocating blade F, to which motion is transmitted in any of the many well-known ways. I have shown it, however, actuated by the crank F on the rock-shaft $F^2$, to which motion is given by the pitman $F^3$, that is actuated from a moving part of the machine. In front of the reciprocating blade F and upon either side of the stalk passage-way that is formed by the prongs A and B, I position the stationary knives G and G'. These stationary knives are the principal cutters and are so located that the forward advance of the machine draws them against the stalks of corn, thus cutting any stalks that may be in their path. They are constructed to provide a cutting edge of considerable length and are arranged to have a gradual inclination toward each other, so that the stalks will be severed by a draw cut gradually instead of being suddenly chopped in two as by a reciprocating cutter. They do not extend entirely across the passage-way, but are so separated that any leaning stalks that are not grasped by the holding and forwarding devices, any grass, weeds, or light stalks of corn that have not sufficient resistance to sustain themselves while the knives are being drawn against them, will thus slide past them and through the opening that is left between them and be severed by the supplemental reciprocating blade that moves across the path behind them. It is essential that the location of the knives be such that the holding and forwarding devices D and D' in their movement shall so sweep these knives as to prevent grass, trash, ears, and stalks lodging and becoming stuck upon them, and act to sweep such stuff to the rear for the reciprocating blade and across the reciprocating blade into the stalk passage-way beyond.

Another of the essential features of this invention is that the supplemental blade shall be so located in relation to the stationary principal knives that it shall enter in its reciprocation the gash or cut that may be made by the principal knives in a stalk that is not entirely severed by these knives. To accomplish this purpose, I have placed the stationary knives in a plane slightly above that of the reciprocating blade, so that the gash in the stalk, as it slides rearwardly on the stationary knives, may be more nearly in the same plane with the reciprocating blade. I do not, however, wish to limit my invention to the placing of the reciprocating blade in the lower plane, and while I consider the so placing of it to be the more preferable construction, still when the reciprocating blade is placed across the stationary knives in the same plane and rests upon the stationary knives it will enter the gash or cut that has been made by the stationary knives. The full result to be gained from the reciprocating blade entering the cut of the stationary knife is not obtained in the construction shown in Figs. 6 and 7, as the reciprocating blade is somewhat pinched. Nevertheless, the constructions here shown are very much superior and produce more favorable results in relieving draft and in preventing choking than if the reciprocating blade did not enter the gash.

It will be noted that in either construction above described the action of the stationary knives depends in one respect entirely upon the forward advance of the machine, and that it is gradual in contradistinction to the operation of a reciprocating cutter, depending somewhat upon the rate of travel of the machine. It is also the fact that the cutting is more evenly distributed over the travel of the machine—i. e., the machine travels farther during the cutting of the stalks in a single hill than in the case of a reciprocating cutter. In another respect the action of these knives depends upon the holding and forwarding devices C D, especially the latter, for it is essential that the stalks be positively held in a vertical position while being cut. These devices therefore traveling backward as the machine moves forward have little or no movement relative to the standing corn, but seize and hold it on either side of the hill against the tendency of the stationary knives to bend the stalks and the tendency of the stalks to yield to the action of the knives. Relative to the machine and to the stalks after they are severed the devices C D are at all times traveling toward the rear, and it is here that their function as forwarding devices especially appears, it being equally essential to the operation of the machine that the stalks should not be allowed to fall or tip either forwardly or backwardly after they are severed, and that they all should be conducted and presented to the binder at the rear in as nearly a straight and vertical position as possible.

Attention is called to the fact that the reciprocating blade entering the gash or kerf made by the stationary knife is wholly dependent upon the holding and forwarding devices upon the machine taking such a hold of the stalks as will keep them from falling forward. The chains C grasp the upper part of the stalks and the chains below seize the lower part or the butts of the stalks, holding them until they are severed and carrying them across the reciprocating blade, and the upper chains still having hold of the stalks keep them in practically an upright position, and thus make it possible for the reciprocating blade in its movement to enter the gash or kerf made by the stationary knife or knives.

It is plain that should the corn-harvesting machine be so built as to incline one prong upon the row of corn more than the other a stationary knife upon that prong would perform much of the work that is done by the stationary knives upon both sides of the row of corn, and that by increasing the size of that stationay knife the knife on the other side could be decreased and become practically but a mere ledger-plate over which the reciprocating knife moves. I consider that my invention would cover a construction of this kind, as I do not wish to limit it to knives of the same size upon both sides of the corn-row in combination with the reciprocating knife; but What I do claim is—

1. In a corn-harvesting machine, the combination of forwardly-projecting prongs forming a passage-way for the stalks, a stationary knife to which the prongs direct the stalks, said knife located at one side of the passage-way with an intervening space between it and the opposite side of said way, a reciprocating blade moving across the rear of said intervening space with the cutting edge of the stationary knife extending in front of it, and stalk holding and forwarding devices located and arranged to grasp the butts of the stalks on opposite sides of the passage-way near the plane of the stationary knife and the blade, and travel rearward with them, and coöperate to confine and hold them in vertical position independently of the knife as they are drawn along the cutting edge thereof by the advance of the machine, and forward them to the rear past the reciprocating blade.

2. In a corn-harvesting machine, the combination of forwardly-projecting prongs forming a passage-way for the stalks, stationary knives to which the prongs conduct the stalks, said knives located on opposite sides of the passage-way with an intervening space between, holding and forwarding devices located and arranged to grasp the stalks on opposite sides of the passage-way near the plane of the knives and travel rearwardly with them, and coöperate to confine and hold them in vertical position, and up to the action of the knives as they are drawn along their cutting edges by the forward motion of the machine, and a reciprocating blade located and arranged so as to enter the cuts or gashes made in the stalks by the stationary knives, and complete the severance while they are held in the grasp of the forwarding devices, said devices acting to hold the stalks vertically independently of the knives and to forward them to the rear after they are severed.

3. In a corn-harvesting machine, the combination of forwardly-projecting prongs forming a passage-way for the stalks, a stationary knife to which the prongs direct the stalks, said knife located on one side of the passage-way with an intervening space between it and the opposite side of said way, said space being continued in rear of the knife, stalk holding and forwarding devices located and arranged to grasp the butts of the stalks near the knife on opposite sides of the passage-way, and a reciprocating blade working across that part of the intervening space which is in rear of the stationary knife, said holding and forwarding devices acting to hold the stalks up to the action of the knife as they are drawn along its cutting edge by the advance of the machine, and to forward them to the rear of the reciprocating blade.

4. In a corn-harvesting machine, the combination of forwardly-projecting prongs forming a passage-way for the stalks, stationary knives to which the prongs direct the stalks, said knives located on opposite sides of the passage-way with an intervening space between and continued beyond them at the rear, stalk holding and forwarding devices located and arranged to grasp the butts of the stalks on opposite sides of the passage-way near the knives, and hold them up to the action of the knives as they pass backwardly along their cutting edges, and a reciprocating blade located and arranged to work across that part of the intervening space which is in rear of the stationary knives in such relation thereto as to enter the cuts or gashes made in the stalks by the stationary knives while the stalks are still held by the holding devices, said holding devices also operating to forward the stalks to the rear after being severed.

5. In a corn-harvesting machine, the combination of forwardly-projecting prongs forming a passage-way for the stalks, stationary knives to which the prongs direct the stalks, said knives located on opposite sides of the passage-way with an intervening space between, a reciprocating blade moving across the rear of the intervening space between the knives and with the cutting edges of said stationary knives extending in front of it, stalk holding and forwarding devices located and arranged to grasp the upper parts of the stalks on either side of the passage-way in advance of the stationary knives, and coöperate to confine and hold them up vertically while passing through the passage-way to the knives, and to forward them to the rear of the machine after they have been severed, and an auxiliary set of holding and forwarding devices located and arranged to seize the butts of the stalks on opposite sides of the passage-way near the plane of the knives and blade, and coöperate to confine and hold that portion of the stalks up to the action of the knives, and assist the upper holding and forwarding devices in maintaining the stalks bodily in vertical position independently of the knives as they are drawn along their cutting edges by the advance of the machine, and in forwarding them to the rear of the machine in vertical position after they have been severed.

6. In a corn-harvesting machine, the combination of forwardly-projecting prongs forming a passage-way for the stalks, stationary knives to which the prongs direct the stalks, said knives located on opposite sides of the passage-way with an intervening space between them that is continued beyond the knives at the rear, stalk holding and forwarding devices located and arranged to grasp the upper parts of the stalk in advance of the stationary knives, and hold them vertically up while passing through the passage-way, an auxiliary set of holding and forwarding devices located and arranged to seize the butts of the stalks on opposite sides of the passage-way near the knives, and hold them up to the action of the same as they pass backwardly along their cutting edges, and a reciprocating blade working across that part of the intervening space which is in rear of the stationary knives, the said two holding and forwarding devices coöperating to maintain the stalks in the bodily vertical position while being cut, and forwarding them to the rear of the machine in such position after they have been severed.

HENRY E. PRIDMORE.

Witnesses:
E. E. CLINTON,
JOHN M. CULVER.